April 26, 1966     D. N. MICHNOFF     3,248,133
EXHAUST DEFROSTER

Filed Oct. 30, 1963     2 Sheets-Sheet 1

INVENTOR
David N. Michnoff

BY Robert C. Sullivan

ATTORNEY

April 26, 1966 D. N. MICHNOFF 3,248,133
EXHAUST DEFROSTER
Filed Oct. 30, 1963 2 Sheets-Sheet 2
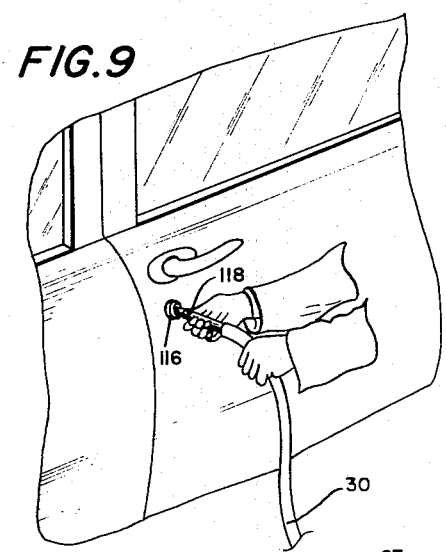
FIG.9
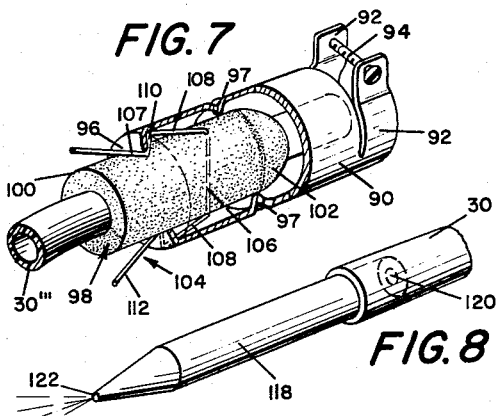
FIG.7
FIG.8
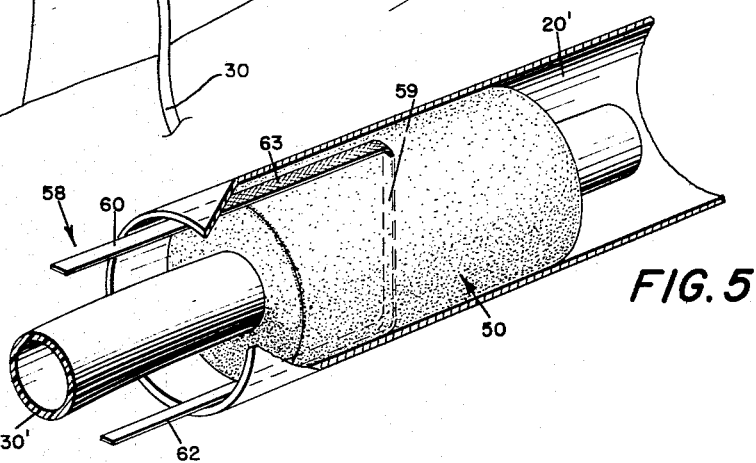
FIG.5
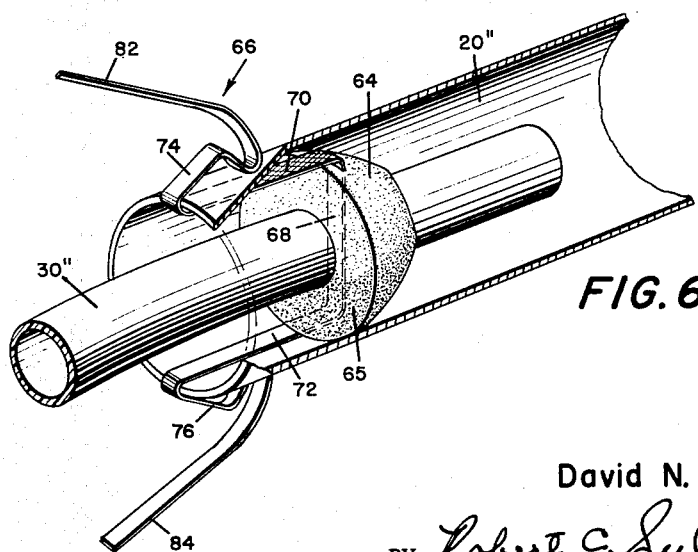
FIG.6
INVENTOR
David N. Michnoff
BY Robert C. Sullivan
ATTORNEY

United States Patent Office 3,248,133
Patented Apr. 26, 1966

3,248,133
EXHAUST DEFROSTER
David N. Michnoff, 7416 W. Park Drive,
West Hyattsville, Md.
Filed Oct. 30, 1963, Ser. No. 320,189
7 Claims. (Cl. 285—177)

This invention relates to an apparatus for use in defrosting and melting snow and ice, particularly on and around automotive vehicles, and more particularly to a defrosting apparatus utilizing the exhaust heat and pressure of the vehicle for the defrosting operations.

While many different types of devices have been developed on the past for use in melting snow and ice on and around automotive vehicles, none of the devices of the prior art has been entirely satisfactory for this purpose. Yet, there is a great need, patricularly in regions having severe winters, for a suitable and inexpensive defrosting device or apparatus for use with automotive vehicles.

Accordingly, it is an object of this invention to provide a defrosting apparatus for automotive vehicles utilizing as a source of defrosting heat, the exhaust heat of the vehicle which would otherwise be wasted.

It is another object of the invention to provide a defrosting device for automotive vehicles which is an accessory device easily attachable to or detachable from the exhaust pipe of any automotive vehicle.

It is another object of the invention to provide a defrosting device for automotive vehicles which can be used in defrosting the front windshield as well as the side and rear windows of the vehicle, for melting snow and ice on and around the tires of the vehicle, and which can also be used for defrosting or thawing the locks of the vehicle.

It is still another object of the invention to provide an accessory device for automotive vehicles which utilizes the exhaust pressure of the vehicle for applying a lubricating material to the locks of the vehicle.

In achievement of these objectives, there is provided in accordance with this invention a defrosting device for use on and around automotive vehicles which includes an elongated hose or flexible conduit, similar to a garden hose, having attached adjacent an end thereof a sealing plug of sponge rubber or other suitable sealing material. In one embodiment of the invention, the sealing plug is secured to the hose by a pin member which also engages a locking slot on a tubular adaptor member which may be clamped onto the end of the exhaust pipe of the vehicle. In another embodiment of the invention, in which an adaptor is also attached to the exhaust pipe of the vehicle, the sealing plug is held to the hose by a resilient clip-like member having locking abutments which engage a radially inwardly extending flange on the adaptor to hold the defrosting hose and sealing plug assembly securely but detachably to the adaptor. In several other embodiments of the invention, the elastic sealing plug is secured to the hose by spring clip members which permit the hose and sealing plug to be directly connected to the exhaust pipe of the vehicle without using an adaptor. In one of the embodiments of the invention in which the hose and attached sealing plug are directly connected to the exhaust pipe, the resilient clip frictionally engages the inner surface of the exhaust pipe, while in another embodiment the resilient clip is provided with clamping or gripping portions which clampingly engage both the inner and outer surfaces of the exhaust pipe of the vehicle. A further feature of the invention is the provision of a cartridge having powdered lubricating material, such as powdered graphite, which may be positioned in the forward or free end of the hose to permit the exhaust pressure to cause the dispensing of the powdered lubricant to the locks of the vehicles.

Further objects and advantages of the invention will become apparent from the following description taken in conjunction with the accompanying drawings in which:

FIG. 5 is a perspective view showing a modified form of coupling connection of the defroster hose adapted to be connected directly to the exhaust pipe of the vehicle;

FIG. 6 is a view similar to FIG. 5 of a still further modified form of coupling connection of the defroster hose adapted to be connected directly to the exhaust pipe of the vehicle;

FIG. 7 is a perspective view of a still further modified coupling connection of the defroster hose using an adaptor connected to the exhaust pipe of the vehicle;

FIG. 8 is a perspective view showing a cartridge containing a lubricant such as powdered graphite or the like connected to the outlet end of the flexible hose which forms part of the accessory device of the invention; and FIG. 9 is a perspective view, partially schematic, showing the accessory device of FIG. 8 being used to lubricate a door lock on the vehicle.

Figure 1:
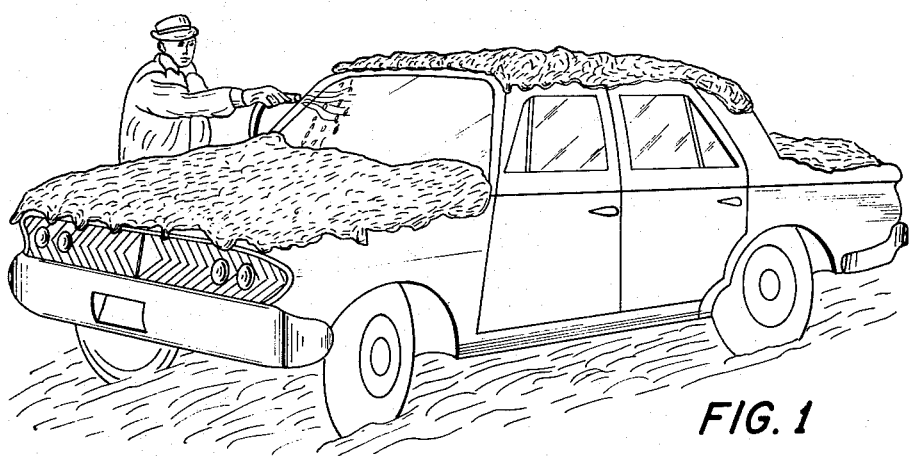
FIG. 1 is a perspective view of an automotive vehicle having the accessory device of the invention attached to the exhaust pipe thereof and showing the motorist using the defrosting device to remove and melt snow from the front windshield of the vehicle.
Figure 2:
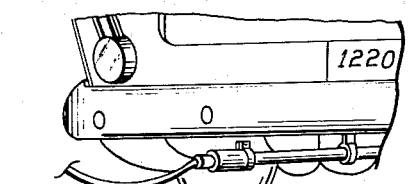
FIG. 2 is a perspective view showing schematically the connection of the defrosting accessory to the exhaust pipe of the vehicle.

Referring now to the drawings, and more particularly to FIGS. 1–4, inclusive, there is shown one form of coupling and sealing assembly generally indicated at 10 by means of which the defrosting device is connected to the exhaust pipe of the automotive vehicle. Coupling assembly 10 includes an adaptor member 12 of hollow cylindrical shape and made of a suitable metal such as a chrome-plated steel, for example. The adaptor 12 is circumferentially cut for approximately 180 degrees of its periphery at the inner end thereof to provide two clamping bands, each generally indicated at 14 and each having an upstanding ear element 16 which may be drawn toward the other ear element 16 by means of a clamping screw or the like 18 to clamp the end of adaptor 12 securely onto the outer end of exhaust pipe 20 of the automotive vehicle.

At its outer or rear end, and at diametrically opposite portions thereof, the adaptor 12 is provided with a locking slot generally indicated at 21, each locking slot 21 including an axially extending slot portion 22 which communicates on its axially inner end with a short circumferentially-extending locking notch 24. Locking slot 21 is adapted to receive the pin locking element 28 of a sealing plug 26 which will now be described.

Figure 3:
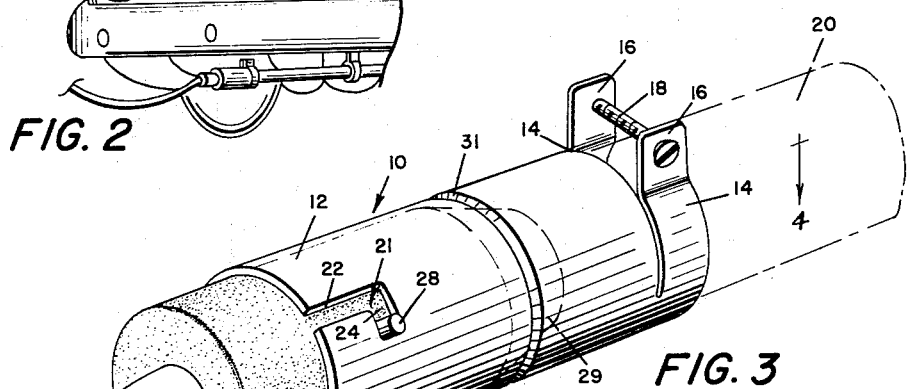
FIG. 3 is a perspective view showing the coupling connection of the defrosting accessory attached to the exhaust pipe of the automotive vehicle.
Figure 4:
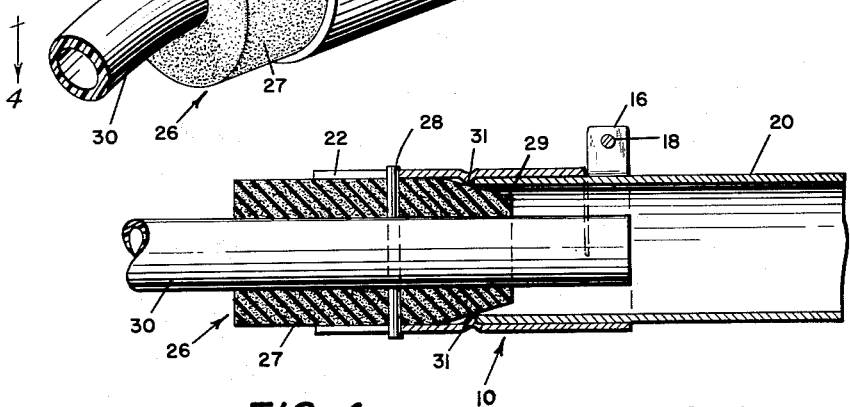
FIG. 4 is a view in longitudinal section of the coupling connection of FIG. 3.

In the embodiment shown in FIGS. 3 and 4, sealing plug 26 forms a means of sealingly connecting to the adaptor 12 and hence to the exhaust pipe 20 an elongated flexible hose 30 which may be similar to a conventional garden hose and be formed of a suitable plastic or rubber material. Hose 30 is used for conducting the hot exhaust gases to the point where the defrosting action is to occur, such as the front windshield or side or rear windows of the automotive vehicles. The sealing plug 26 is preferably made of a material such as sponge rubber and is formed into hollow tubular shape. Plug 26 includes a cylindrical portion 27 extending for a substantial part of the length of the plug and having an outer diameter which provides a tight frictional fit of the plug in the rear end of adaptor 12 when plug 26 is positioned therein. Plug 26 terminates at its inner or forward end in a tapered nose portion 29 which enters into the rear end of exhaust pipe 20 to provide an effective sealing action which insures that all of the exhaust gases pass into the hose 30.

The sealing plug 26 is provided throughout its length with an axial passage adapted to receive the end of hose 30. The hose 30 is inserted through the passage in the sealing plug 26 and, as best seen in the view of FIG. 4, projects a short distance, such as one inch, for example, beyond the nose portion 29 of the plug.

In order to securely hold sealing plug 26 onto the end of hose 30, and also to securely but detachably lock the hose with the attached sealing plug thereon to the outer end of adaptor 12, the locking pin 28 extends diametrically through the cylindrical portion 27 of plug 26 and through the hose 30 to thereby lock the plug 26 onto the hose. The ends of pin 28 project a short distance beyond the outer periphery of the sponge rubber plug and permit pin 28 to serve the additional function of locking the hose 30 and attached plug 26 to locking slot 21 at the rear end of adaptor 12.

Adaptor 12 is suitably indented either at several points or around its entire periphery as indicated at 31 to form a stop or abutment means which engages the rearward end of exhaust pipe 20 to properly locate the adaptor 12 relative to exhaust pipe 20 when the adaptor is being clamped onto the exhaust pipe. This insures that when plug 26 is engaged with adaptor 12 by means of the pin and slot connection the tapered end 29 of the plug will be properly engaged with exhaust pipe 20.

Hose 30, with sealing plug 26 secured thereto by pin 28, constitutes a separate sub-assembly which may be easily attached to or disconnected from the adaptor 12.

In using the defrosting apparatus of FIGS. 1–4, the adaptor 12 is securely clamped to the rear end of exhaust pipe 20 by means of the clamping bands 14 which are tightened into clamped position using the clamping screw 18. Adaptor 12 may be left permanently in position on the exhaust pipe once it has been installed. When it is desired to use the defrosting apparatus, the hose 30 and attached sealing plug 26 are engaged in locked relation with the rear end of adaptor 12 by engaging the projecting ends of locking pin 28 with the diametrically opposed axially-extending slot portions 22 and then pushing plug 26 inwardly to slide the pin 28 along slot portions 22 until the opposite ends of pin 28 reach the diametrically opposed locking notches 24. When the ends of pin 28 reach the locking notches 24, the plug is given a slight clockwise turn with respect to the view shown in FIG. 3 to cause each of the opposite projecting ends of pin 28 to engage the corresponding locking slot or notch 24 to thereby securely retain the hose 30 and attached plug 26 in securely locked relation to the rear end of the adaptor sleeve.

With the engine of the vehicle turned on, so that exhaust gases pass outwardly through exhaust pipe 20, the defrosting apparatus may then be used as shown schematically in FIG. 1 in which the motorist holds the open end of the hose 30 adjacent the windshield of the vehicle and directs the exhaust gases issuing from the free open end of the hose toward the windshield, thereby melting the snow which has accumulated thereon. The snow or ice may similarly be removed from the side and rear windows of the vehicle and the outlet end of the hose may also be positioned close to the door locks of the vehicle to permit the exhaust gases to thaw the locks if necessary.

There is shown in FIG. 5 a modified embodiment of the invention in which the hose and attached sealing plug are so constructed that they may be directly connected to the exhaust pipe of the automotive vehicle without the use of an adaptor member as was required in the embodiment of FIGS. 3 and 4. The embodiment of FIG. 5 shows the hose 30' having attached thereto a sealing plug 50 which may be made of sponge rubber or the like. The sealing plug 50 is of substantially cylindrical shape having an outer diameter sufficient to provide a good sealing contact with the internal surface of exhaust pipe 20', and is provided with an axial passage therethrough for receiving the hose 30', the hose projecting beyond the end of sealing plug 50 for a short distance such as one inch.

In order to securely engage sealing plug 50 to hose 30' and also to connect the end of hose 30' and the attached sealing plug 50 securely to exhaust pipe 20', a resilient fastening and gripping element generally indicated at 58 is secured to plug 50 and hose 30'. The gripping element 58 may be formed of a narrow strip of spring steel bent into generally U-shape with the bight or cross portion 59 thereof passing through sealing plug 50 intermediate the axial ends of the plug and through hose 30' in a plane perpendicular to the longitudinal axis of the plug and of the hose. The fastening member 58 includes two legs 60 and 62 which extend from opposite ends of bight portion 59.

The radially outer surfaces of legs 60 and 62 are roughened as indicated at 63 for most of the lengths of the respective legs, except for the outer ends of the legs which serve as finger grips when the sealing plug is being engaged with or removed from the exhaust pipe. The roughened surfaces of legs 60 and 62 provide improved frictional contact between the legs and the inner surface of the exhaust pipe.

Due to the spring-like characteristics of the metal of which fastener member 58 is formed, legs 60 and 62 normally tend to expand to have a spacing therebetween greater than that of the internal diameter of exhaust pipe 20'. Thus, when hose 30' and attached sealing plug 50 are inserted into the exhaust pipe 20' as seen in the view of FIG. 5, it is necessary to compress legs 60 and 62 toward each other to permit them to fit within the rear end of exhaust pipe 20'. After plug 50 is in position in the exhaust pipe, as seen in FIG. 5, the resiliency of legs 60 and 62 tends to expand them to their normal uncompressed spacing, and in so doing, the legs bind against the diametrically opposite interior surface portions of the rear end of exhaust pipe 20' to firmly frictionally secure the end of the hose and the attached sealing plug in position in the exhaust pipe. When it is desired to remove the hose and attached sealing plug from their connection to exhaust pipe 20', it is merely necessary to manually compress the outer ends of legs 60 and 62 of gripping member 58 toward each other to thereby release the gripping engagement of legs 60 and 62 on the interior surface of exhaust pipe 20' to permit hose 30' and attached sealing plug 50 to be removed from their connection to exhaust pipe 20'.

In the modified form of the invention shown in FIG. 6, there is shown a defroster hose 30" having attached thereto a sealing plug 64 of truncated hemispherical shape. Plug 64 is provided at its rearwardly-facing end with a planar surface 65 which lies in a plane perpendicular to the axis of hose 30" and which has an outer diameter sufficient to provide a good sealing fit with the internal surface of exhaust pipe 20".

Sealing plug 64 is preferably formed of sponge rubber or the like and is provided with an axial passage to receive hose 30". The end of hose 30" projects forwardly of the truncated end of plug 64 for a distance such as one inch. Plug 64 is secured to hose 30" by a fastening and clamping or gripping member generally indicated at 66 which is formed of a narrow strip of spring steel, or which may also be made of piano wire. Fastening member 66 includes a bight portion 68 which extends through the sealing plug 64 intermediate the axial ends thereof and through the hose 30", thereby locking plug 64 to the hose. Fastening member 66 also includes two legs 70 and 72 which extend rearwardly from opposite ends of bight portion 68. The radially outer surfaces of legs 70 and 72 are roughened for most of their length, except at the outer ends thereof which serve as finger grips. The roughened surfaces of legs 70 and 72 provide improved frictional contact between the legs and the inner surface of exhaust pipe 20″. Due to the spring characteristics of the material of which member 66 is formed, legs 70 and 72 tend to expand to have a spacing therebetween which is greater than the inner diameter of exhaust pipe 20″. At the rear ends of legs 70 and 72, each leg is reversely bent upon itself to include reversely bent portions 74 and 76. When the hose and attached plug are positioned on the end of the exhaust pipe, as shown in FIG. 6, the axially forward ends of the reversely bent portions 74 and 76 closely engage the outer surface of the exhaust pipe so that each leg 70 and 72 and its corresponding reversely bent portion 74 or 76 defines a clip which grips the inner and outer surfaces of the exhaust pipe. Each of the clip portions 70–74 and 72–76 includes a rearwardly extending leg portion 82 and 84 respectively which may be compressed toward each other when it is desired to release the plug 64 and attached fastener 66 from engagement with exhaust pipe 20″. When fastener 66 is released from engagement with exhaust pipe 20″, the sealing plug 64 and hose 30″ may then be easily withdrawn from the exhaust pipe.

There is shown in FIG. 7 a still further modified form of the invention in which the defroster hose and attached sealing plug are adapted for connection to an adaptor member 90 which, in turn, is connected to the exhaust pipe of the automotive vehicle.

Adaptor 90 is hollow cylindrical shape and made of a suitable metal such as chrome-plated steel, and is provided with clamping bands 92 which may be drawn into clamped engagement with the exhaust pipe (not shown) by means of a screw 94 in a manner similar to the clamping structure shown in the embodiment of FIGS. 3 and 4.

The adaptor 90 is provided at its rearwardly-facing end with an annular flange 96 which extends radially inwardly from the outer periphery of the adaptor for a distance such as ⅛–¼ inch, for example, to thereby provide an opening of lesser diameter than the outer diameter of the adaptor. Adaptor 90 is suitably indented either at several points or around its entire periphery as indicated at 97 to form a stop or abutment means which engages the rearward end of exhaust pipe 20 to properly locate the adaptor 12 relative to exhaust pipe 20 when the adaptor is being clamped onto the exhaust pipe. The indentations 97 are so located on adaptor 90 as to insure that the tapered end 102 of the sealing plug 100, to be described, properly engages the exhaust pipe. The hose 30‴ has attached adjacent an end thereof a tubular sealing plug 98 formed of sponge rubber or the like, plug 98 being provided with an axial passage therethrough to permit the hose 30‴ to extend through the plug and a short distance beyond the normally forwardly disposed end of plug 98. The plug 98 may be generally similar to the plug 26 described in connection with the embodiment of FIGS. 3 and 4 and includes a cylindrical outer surface portion 100 which extends for a substantial portion of the length of plug 98, and a tapered nose portion 102 at the normally forwardly disposed end of the sealing plug to provide a good sealing engagement between the sealing plug and the exhaust pipe which it engages in a manner similar to that shown in FIG. 4.

The outer diameter of cylindrical portion 100 of the sealing plug 98 is so dimensioned as to provide a good sealing fit with the inner circumferential edge of the annular flange 96. The sealing plug 98 is secured to hose 30‴ by a fastener and clamping element generally indicated at 104 and formed of piano wire. Fastener 104 includes a bight portion 106 which passes through the cylindrical portion 100 of plug 98, to thereby secure the plug to hose 30‴. Fastener 104 also includes a pair of opposite leg elements generally indicated at 107 which extend from opposite ends of bight portion 106. The legs 107 include straight portions 108 extending from the opposite ends of bight portion 106 which, due to spring-like characteristics of the material of which fastener 104 is formed, tend to diverge outwardly to have a spacing there-between which is greater than the internal diameter of the adaptor 90. Legs 107 are bent inwardly at the outer end of straight portions 108 to define radially inwardly bent abutment portions 110, the legs then being bent rearwardly at the radially inner end of abutment portions 110 to define the rearwardly extending leg portions 112.

In using the modified defroster assembly of FIG. 7, the adaptor 90 is secured to the exhaust pipe of the vehicle at a position determined by the abutment of indentations 97 on the adaptor with the rearward end of the exhaust pipe. Clamping bands 92 are tightened into clamping engagement with the exhaust pipe by means of adjusting screw 94 to hold the adaptor to the exhaust pipe. Defrosting hose 30‴ and sealing plug 98 attached thereto may then be inserted into rearwardly facing end opening of adaptor 90 by compressing leg portions 112 of the fastener 104 toward each other to thereby move the leg portions 108 and the radially inwardly extending bent abutment portions 110 radially inwardly sufficiently to permit the clip and attached hose 30‴ and sealing plug 98 to pass through the reduced diameter end opening of adaptor 90 to the position shown in FIG. 7. Once the abutment portions 110 of the fastener have passed axially inwardly of the axially inner surface of annular flange 96, the portions 108 of the clip can expand radially outwardly into engagement with the inner surface of adaptor 90. In this position, the radially inwardly extending abutments 110 abut against the axially inner surface of radial flange 96 to prevent accidental or undesired removal of the sealing plug assembly from the adaptor unless the leg portions 112 are intentionally compressed to permit removal of the plug assembly.

As shown in FIG. 9, the hose 30 which is attached to the exhaust pipe of the automotive vehicle by any of the coupling arrangements previously described may also be used for thawing the door locks of the vehicle or for applying a powdered lubricant such as powdered graphite to the door locks. Thus, if it is desired to thaw the door lock, the free open end of hose 30 is positioned adjacent the lock 116 and the hot exhaust gases issuing from the end of the hose cause the thawing of the lock. If it is desired to apply a powdered lubricant such as powdered graphite to the lock 116, the cartridge 118 shown in FIG. 8 is inserted in the free open end of hose 30. The cartridge 118 is provided with an opening 120 at the innermost end of the cartridge which is disposed within the free end of hose 30. The opposite end of cartridge 118 has an outlet opening 122. Suitable closure means (not shown) may be used to cover the openings 120 and 122 when the cartridge 118 is not in use.

In using cartridge 118 for applying powdered graphite or other lubricant to the lock 116, the cartridge 118 is manually held in the position shown in FIG. 9 and the outlet opening 122 of the cartridge is placed against the lock 116 which is to be lubricated. The force of the exhaust gases issuing from the free end of the hose 30 is applied to the contents of the cartridge through opening 120 and forces the powdered graphite lubricant outwardly through outlet opening 122 and into the lock 116 which is to be lubricated. The cartridge 118 is held in position manually in the free end of hose 30 during the lubricating process so that the cartridge may be quickly removed from the end of the hose 30 after a sufficient amount of the powdered graphite or the like has been dispensed into the lock. Only a relatively small amount of graphite is needed to lubricate the lock, and the cartridge 118 need be held in place only a few seconds and may then be removed from its connection to the hose 30.

It can be seen from the foregoing that there are provided in accordance with the various embodiments of this invention accessory devices which may be attached to the exhaust pipe of the automotive vehicle to utilize the heat and pressure from the exhaust gases for defrosting the windshield or windows and locks of the vehicle, or for melting snow and ice on and around the tires of the vehicle. The defrosting devices of the invention may be easily attached to or removed from the exhaust pipe of the vehicle and may be manufactured economically and sold at a nominal price. The accessory devices may also be used for applying powdered lubricant to the door locks of the vehicle.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. An apparatus for use in defrosting in and around automotive vehicles, comprising a flexible tubular conduit, a sealing plug coaxially mounted on said conduit adjacent an end thereof and extending radially outwardly of said conduit, fastener means extending through said sealing plug and through said conduit and securing said sealing plug to said conduit, said sealing plug being adapted to engage in sealing relation an outlet pipe connected to the exhaust system of the automotive vehicle to thereby connect the interior of said flexible conduit to said exhaust system, said fastener means being adapted to detachably engage said outlet pipe to thereby secure said tubular conduit and said sealing plug to said outlet pipe.

2. An apparatus as defined in claim 1 in which said outlet pipe is an adaptor pipe adapted to be detachably connected to the exhaust pipe of the automotive vehicle.

3. An apparatus as defined in claim 1 in which said sealing plug is made of sponge rubber.

4. An apparatus for use in defrosting in and around automotive vehicles, comprising a flexible tubular conduit, a sealing plug coaxially mounted on said conduit adjacent an end thereof and extending radially outwardly of said conduit, a flexible fastener member including a bight portion extending in a direction transverse of the longitudinal axis of said conduit through said conduit and said sealing plug to secure said sealing plug to said conduit, said sealing plug being adapted to engage in sealing relation the exhaust pipe of the automotive vehicle to thereby connect the interior of the flexible conduit to the exhaust system of the vehicle, said fastener member including flexible leg portions extending from said bight portion and adapted to frictionally engage the exhaust pipe of the automotive vehicle to thereby detachably secure said tubular conduit to said exhaust pipe.

5. An apparatus as defined in claim 4 in which said flexible leg portions include portions adapted to frictionally engage the interior surface of the exhaust pipe and reversely bent portions adapted to frictionally engage the outer surface of the exhaust pipe.

6. An apparatus for use in defrosting in and around automotive vehicles, comprising a flexible tubular conduit, a sealing plug coaxially mounted on said conduit adjacent an end thereof and extending radially outwardly of said conduit, a flexible fastener member including a bight portion extending in a direction transverse of the longitudinal axis of said conduit through said conduit and said sealing plug to secure said sealing plug to said conduit, said sealing plug being adapted to engage in sealing relation an adaptor pipe connected to the exhaust pipe of the automotive vehicle to thereby connect the interior of the flexible conduit to the exhaust system of the vehicle, said adaptor pipe including a radially inwardly extending flange portion adapted to be sealingly engaged by said selaing plug, said fastener member including flexible leg portions extending rearwardly from said bight portion, said flexible leg portions including radially inwardly extending abutment portions intermediate the length thereof and rearwardly extending leg portions extending from the radially inner ends of said abutment portions, whereby when said sealing plug is in engagement with said adaptor pipe said abutment portions abut against said radially inwardly extending flange portion of said adaptor pipe and said rearwardly extending leg portions extend rearwardly of said radially inwardly extending flange portion and serve as finger grip elements.

7. An apparatus for use in defrosting in and around automotive vehicles, comprising a flexible tubular conduit, a sealing plug coaxially mounted on said conduit adjacent an end thereof and extending radially outwardly of said conduit, fastener means extending through said sealing plug and through said conduit in a direction transverse of the longitudinal axis of said conduit and securing said sealing plug to said conduit, said sealing plug being adapted to engage in sealing relation an outlet pipe connected to the exhaust system of the automotive vehicle to thereby connect the interior of said flexible conduit to said exhaust system, said fastener means being adapted to detachably engage said outlet pipe to thereby secure said tubular conduit and said sealing plug to said outlet pipe.

References Cited by the Examiner

UNITED STATES PATENTS

| | | | |
|---|---|---|---|
| 1,359,967 | 11/1920 | Copley et al. | 126—271.1 |
| 2,152,429 | 3/1939 | Cave | 285—8 |
| 2,515,341 | 7/1950 | Giguere | 126—271.1 |
| 2,901,182 | 8/1959 | Cragg et al. | 239—129 |
| 2,984,419 | 5/1961 | McQuat | 239—129 |

JAMES W. WESTHAVER, *Primary Examiner.*

CHARLES J. MYHRE, *Assistant Examiner.*